(12) United States Patent
Xu

(10) Patent No.: US 7,498,793 B2
(45) Date of Patent: Mar. 3, 2009

(54) CURRENT-MODE DC-TO-DC-CONVERTER

(75) Inventor: Ruiqing Xu, Beijing (CN)

(73) Assignee: O2Micro International Ltd., Georgetown (KY)

( * ) Notice: Subject to any disclaimer, the term of this patent is extended or adjusted under 35 U.S.C. 154(b) by 104 days.

(21) Appl. No.: 11/716,404

(22) Filed: Mar. 9, 2007

(65) Prior Publication Data

US 2008/0218145 A1 Sep. 11, 2008

(51) Int. Cl.
*G05F 1/575* (2006.01)
*G05F 1/62* (2006.01)

(52) U.S. Cl. .................. 323/288; 323/284; 323/285

(58) Field of Classification Search ............... 323/222, 323/223, 259, 282, 284, 285, 344, 345, 351, 323/288

See application file for complete search history.

(56) References Cited

U.S. PATENT DOCUMENTS

| | | | |
|---|---|---|---|
| 6,225,794 B1 * | 5/2001 | Criscione et al. | 323/283 |
| 6,388,429 B1 * | 5/2002 | Mao | 323/222 |
| 6,873,140 B2 * | 3/2005 | Saggini et al. | 323/283 |
| 7,183,517 B2 * | 2/2007 | Albrecht et al. | 219/130.4 |
| 7,365,525 B2 * | 4/2008 | Zhou et al. | 323/282 |

* cited by examiner

*Primary Examiner*—Gary L Laxton
(74) *Attorney, Agent, or Firm*—Wang Law Firm, Inc.; Li K. Wang (57) ABSTRACT

A current-mode DC-to-DC converter operating in a high frequency is disclosed. The current-mode DC-to-DC converter includes an inductor, a power switch, an oscillator, an adder without internal feedback loop, an error amplifier, a comparator, a compensation unit and a driver. The adder adds a ramp signal from the oscillator directly to a voltage signal relative to a current flowing through the power switch and generates a sum signal based upon match between internal components in the oscillator and the adder.

17 Claims, 9 Drawing Sheets

CURRENT-MODE DC-TO-DC-CONVERTER

FIELD OF THE INVENTION

The present invention generally relates to converters, and more particularly to a direct-current (DC)-to-direct-current (DC) converter with enhanced performance.

BACKGROUND OF THE INVENTION

Currently, direct-current (DC)-to-direct-current (DC) converters are becoming increasingly common in today's society as the capabilities and use of such DC-to-DC converters continue to expand. DC-to-DC converters are typically employed to convert one DC voltage level to another desirable DC voltage level. The DC-to-DC converters can be widely used in a variety of environments. One kind of such converters is referred to as constant on time converter, also known as pulse-frequency modulated (PFM) converter. Another kind of such converters is referred to as fixed frequency converter, also known as pulse-width modulated (PWM) converter. A PWM converter usually is divided into two categories, a voltage-mode converter and a current-mode converter.

A voltage-mode converter includes a control loop that contains an error amplifier, a PWM comparator, and one or more drivers. Usually a synchronous rectifier is included in the voltage-mode converter to improve performance. The output voltage of the voltage-mode converter is compared with a reference voltage by the error amplifier. The PWM comparator receives the output of the error amplifier as its first input and receives a saw-tooth or triangle signal from an external device as its second input. The PWM comparator's output is a PWM signal that is amplified by the drivers and the driver will drive power switches. The advantage of this kind of converters is its simplicity in architecture. Its major disadvantages are low precision and slow response to transient loads because of the compensation needed for the error amplifier.

Figure 1:
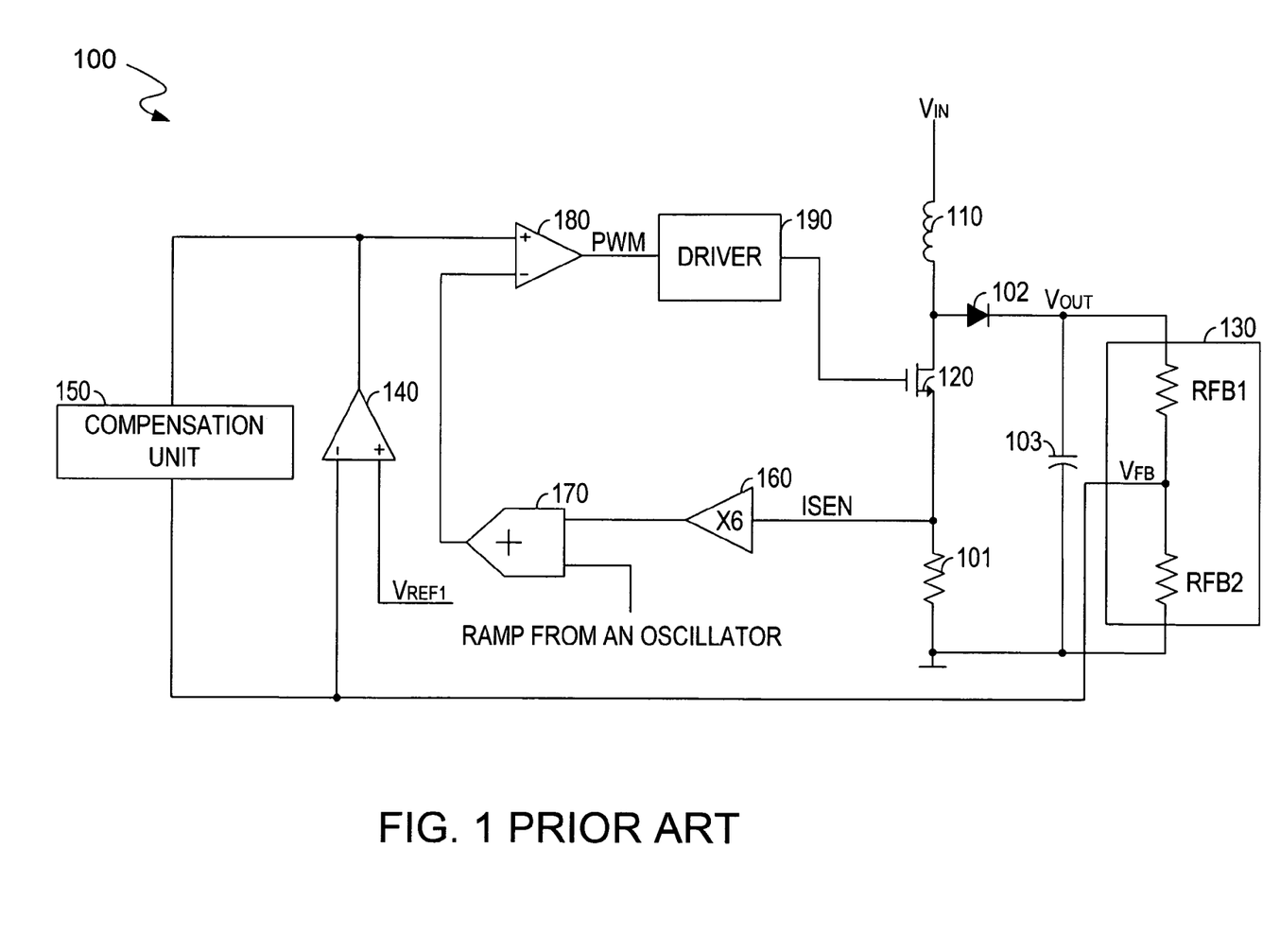
FIG. 1 is a block diagram of a prior art current-mode boost converter.

A current-mode converter includes two control loops, an inner current loop and an outer voltage loop that controls the inner current loop. With reference to FIG. 1, a prior art current-mode boost converter 100 is illustrated. The boost converter 100 is composed of an inductor 110, a power switch 120, a voltage divider 130, an error amplifier 140, a compensation unit 150, an amplifier 160, an adder with an internal feedback loop 170, a comparator 180, and a driver 190. The inductor 110 is coupled to an external load (not shown) via a diode 102 and a capacitor 103. The inductor 110 receives an input voltage $V_{IN}$ from an external source (not shown). An output voltage $V_{OUT}$ larger than $V_{IN}$ can be supplied by the boost converter 100 to power the external load. When the power switch 120 is turned on, a current can flow through a resistor 101 and convert to a voltage signal. The voltage signal with a component of the current is then delivered to the amplifier 160 and amplified with a factor, for example, 6. The amplified voltage signal will be added to a ramp signal from an oscillator (not shown) and the adder 170 generates a sum signal.

The voltage divider 130 can scale down the output voltage $V_{OUT}$ and deliver a feedback voltage to the error amplifier 140. The error amplifier 140 compares the feedback voltage with a reference voltage and generates an error signal to the comparator 180. The comparator 180 compares the error signal with the sum signal from the adder 170 and generates a PWM signal to the driver 190. The driver 190 converts the PWM signal to a control signal to drive the power switch 120. The compensation unit 150 provides frequency compensation so as to regulate the output voltage $V_{OUT}$.

Figure 2:
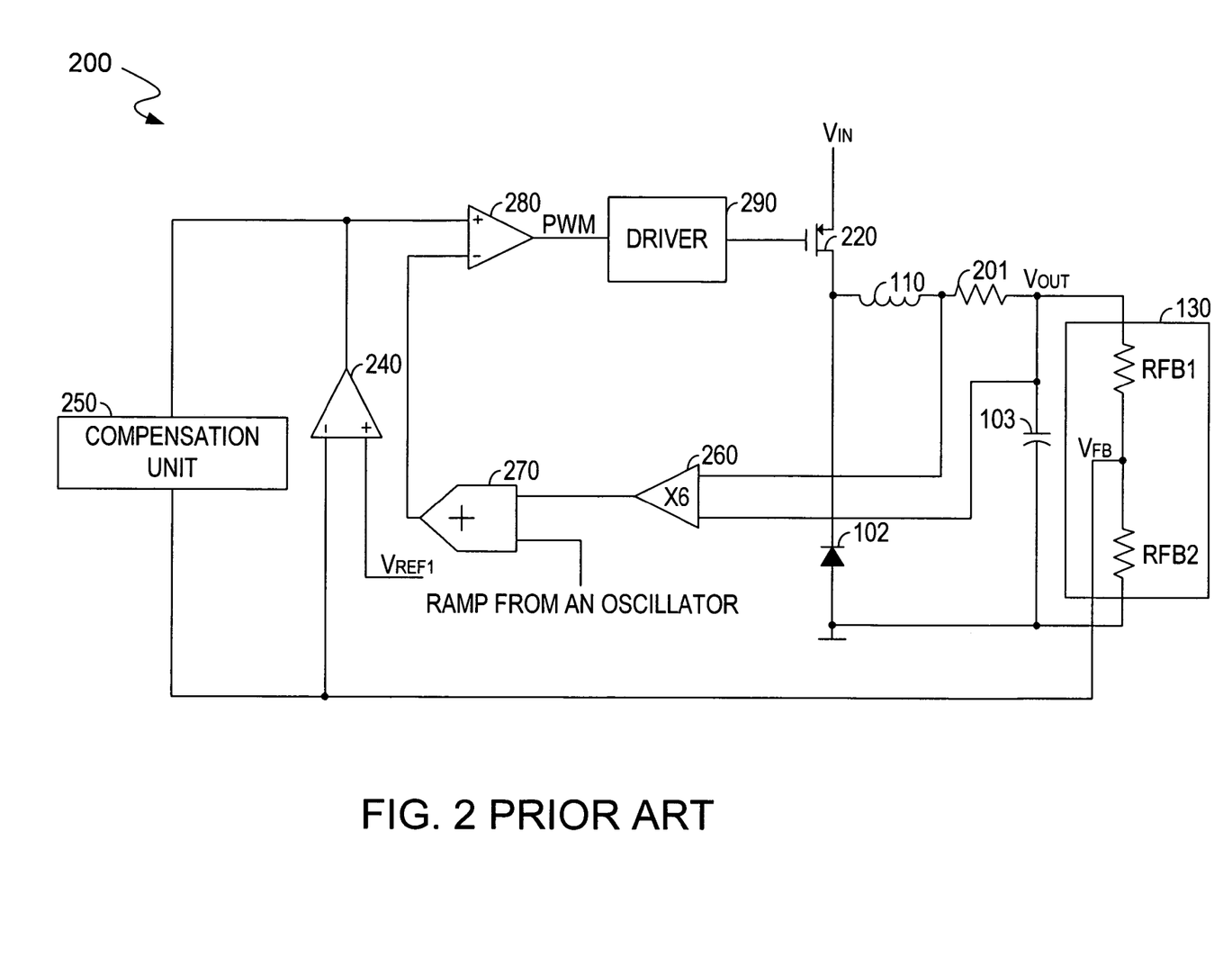
FIG. 2 is a block diagram of a prior art current-mode buck converter.

FIG. 2 illustrates a block diagram of a prior art current-mode buck converter 200. The buck converter 200 is configured similar to the boost converter 100, so the symbols for the similar components are consistent. Hence, the description of the functions for these similar components of the buck converter 200 will be omitted herein for clarity. The buck converter 200 includes a power switch 220. The buck converter 200 can provide an output voltage $V_{OUT}$ smaller than the input voltage $V_{IN}$.

The insertion of the amplifier 160 or 260 may have a certain bandwidth requirement and also result in signal distortion, slow transient response and large limitation on the switching frequency of the power switch 120 or 220. Moreover, a feedback loop included in the adder 170 or 270 used to improve the stability of the converters has bandwidth requirements that also cause a great limitation on the switching frequency of the power switch 120 or 220. Additionally, the instability for D (duty cycle)>0.5 is a well-known problem in the IC design. Therefore, a ramp signal added to the current flowing through the power switch 120 or 220 is required for the converter 100 or 200 to maintain its output signal stable for all duty cycles. However, the addition of the ramp signal has an effect on reducing the again of the inner switch-current-sensing discrete feedback loop formed by the amplifier 160 and the adder 170. Hence, the major disadvantages of the conventional current-mode converter 100 or 200 are the complexity of circuitry configuration and limited switching frequency, for example, less than 1 MHz.

It is thus desirous to have an apparatus and method that can provide a current-mode DC-to-DC converter with a simplified configuration, high precision and good stability that operates when the switching frequency of a power switch is high and at the same time improve the transient response of the current-mode DC-to-DC converter, and it is to such apparatus and method the present invention is primarily directed.

BRIEF SUMMARY OF THE INVENTION

In one embodiment, there is disclosed a current-mode converter. The current-mode boost converter includes an inductor, a power switch, an oscillator, an adder, an error amplifier, a comparator and a driver. The power switch is coupled to the inductor and capable of providing a voltage signal according to a current flowing through the power switch. The oscillator generates a ramp signal. The adder is coupled to the inductor and capable of adding the ramp signal from the oscillator to the voltage signal and generating a sum signal. The error amplifier compares a feedback voltage with a reference voltage and generates an error signal. The comparator compares the error signal with the sum signal and generates a pulse-width modulation (PWM) signal. The driver receives the PWM signal and generates a switch control signal to control the power switch and the adder.

In another embodiment, there is disclosed a method for converting a DC input voltage to a DC output voltage. The method includes the steps of (a) receiving the DC input voltage, (b) sensing a current flowing through a power switch according to the DC input voltage, (c) generating a voltage signal according to the sensed current, (d) adding a ramp signal to the voltage signal at an adder without an internal feedback loop, (e) comparing an addition result with a predetermined error signal, (f) generating a PWM signal according to a comparison result between the error signal and the addition result, (g) converting the PWM signal to a switch control signal, (h) driving the power switch with the switch control signal, (i) controlling the addition of the ramp signal and the voltage signal with the switch control signal, and (j) generating a DC output voltage under control of the power switch.

In yet another embodiment, there is disclosed an electronic system. The electronic system includes an input device, a controller, and a power supply. The input device takes inputs from an user. The controller performs operations based on the inputs from the user. The power supply supplies power to the electronic system. The power supply includes a current-mode converter. The current-mode converter includes an inductor, a power switch, an oscillator, an adder, an error amplifier, a comparator and a driver. The power switch is coupled to the inductor and capable of providing a voltage signal according to a current flowing through the power switch. The oscillator generates a ramp signal. The adder is coupled to the inductor and capable of adding the ramp signal from the oscillator to the voltage signal and generating a sum signal. The error amplifier compares a feedback voltage with a reference voltage and generates an error signal. The comparator compares the error signal with the sum signal and generates a pulse-width modulation (PWM) signal. The driver receives the PWM signal and generates a switch control signal to control the power switch and the adder.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 3:
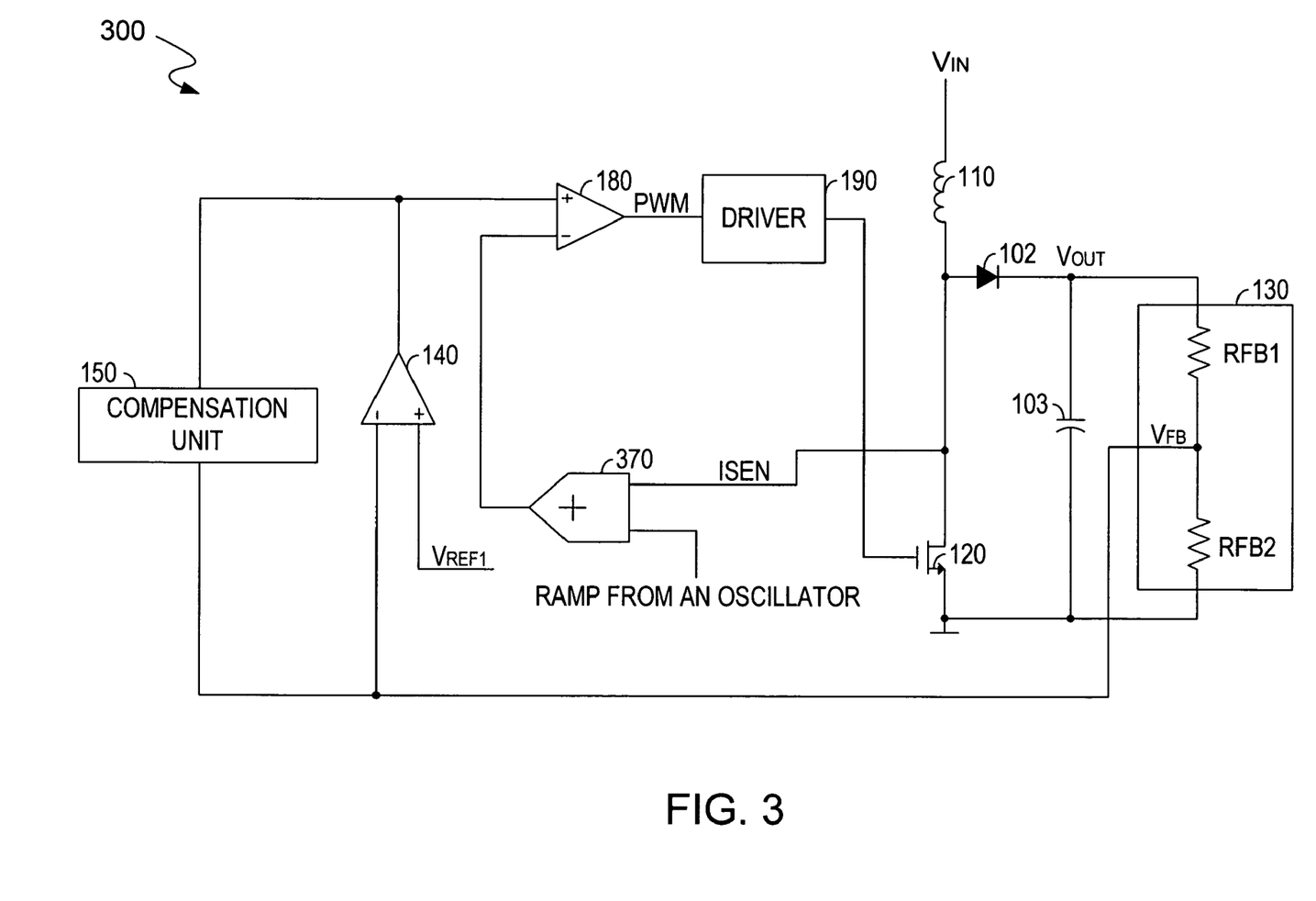
FIG. 3 is a block diagram of an exemplary current-mode boost converter according to one embodiment of the present invention.

FIG. 3 illustrates a block diagram of an exemplary current-mode boost converter 300. Similar to the boost converter 100 shown in FIG. 1, the boost converter 300 includes the inductor 110, the power switch 120, the voltage divider 130, the error amplifier 140, the compensation unit 150, the comparator 180 and the driver 190. The power switch 120 is preferably implemented as an N-channel Metal Oxide Semiconductor Field Effect Transistor (MOSFET). However, other suitable device with similar characteristics may also be used as the power switch 120. The boost converter 300 converts a lower DC voltage $V_{IN}$ to a higher DC voltage $V_{OUT}$ to drive an external load (not shown). The boost converter 300 is coupled to the external load via the diode 102 and the capacitor 103. The diode 102 can prevent the current from flowing back to the boost converter 300. The boost converter 300 further includes an adder without an internal feedback loop 370. The adder 370 is coupled to the inductor 110, an anode of the diode 102 and a drain terminal of the power MOSFET 120 (i.e., the power switch 120).

Generally, the boost converter 300 stabilizes the output voltage $V_{OUT}$ according to a reference signal at an input terminal of the error amplifier 140. During a transient period, the output voltage is in the process of switching from one DC state to anther DC state. The boost converter 300 effectively reduces the recovery time of the output voltage $V_{OUT}$ during the transient period by modifying the duty cycle of an internal PWM signal in order to drive the output voltage $V_{OUT}$ to the desired steady state.

During a transient period, a voltage signal ISEN equal to the current flowing through the power switch 120 multiplied by a conductance resistance of the power switch 120 is generated at an anode of the diode 102. The voltage signal ISEN is then sent to the adder 370 as its first input. The adder 370 receives a ramp signal from an external oscillator (not shown) as its second input. The ramp signal is preferably a fixed saw-tooth signal. The adder 370 adds the voltage signal ISEN to the ramp signal and then generates a sum signal to the comparator 180. The addition function will be described in detail below. Although the voltage signal ISEN is not large, it is not necessary to amplify the voltage signal ISEN, which is equal to the current flowing through the power switch 120 multiplied by the conductance resistance of the power switch 120 before being sent to the adder 370 in this embodiment. The configuration without an amplifier will greatly reduce the complexity of the integrated circuit and avoid the problems related to, for example, the bandwidth requirement for the amplifier, the limitation on the switching frequency for the power switch 120, and the signal distortion caused by the amplifier.

The voltage divider 130 includes two resistors to scale down the output voltage $V_{OUT}$ and generate a feedback voltage to the error amplifier 140 and the compensation unit 150. The error amplifier 140 compares the feedback voltage with a reference voltage $V_{REF1}$ provided by the boost converter 300 or an external source (not shown) and generates an error signal to the comparator 180. The comparator 180 compares the error signal from the error amplifier 140 with the sum signal from the adder 370 and generates a PWM signal with a duty cycle whose variance determines an increase or decrease in the output voltage $V_{OUT}$. Further, the comparator 180 forces the output voltage $V_{OUT}$ to follow the reference signal $V_{REF1}$ by increasing or decreasing the pulse width of its output PWM signal (i.e., the duty cycle of its output PWM signal) if the output voltage $V_{OUT}$ is lower or higher than the reference signal $V_{REF1}$. Specifically, the driver 190 receives the PWM signal as its input and generates a switch control signal SWON to drive the power switch 120 high and low alternatively to control the output voltage $V_{OUT}$. As a result, the output signal $V_{OUT}$ approximates the reference voltage $V_{REF1}$. Additionally, a LC low-pass filter formed by the inductor 110 and the capacitor 103 is coupled to the external load. The inductance of the inductor 110 in the low-pass filter should be kept as small as possible in order to reduce the recovery time for a transient of the external load.

Figure 4:
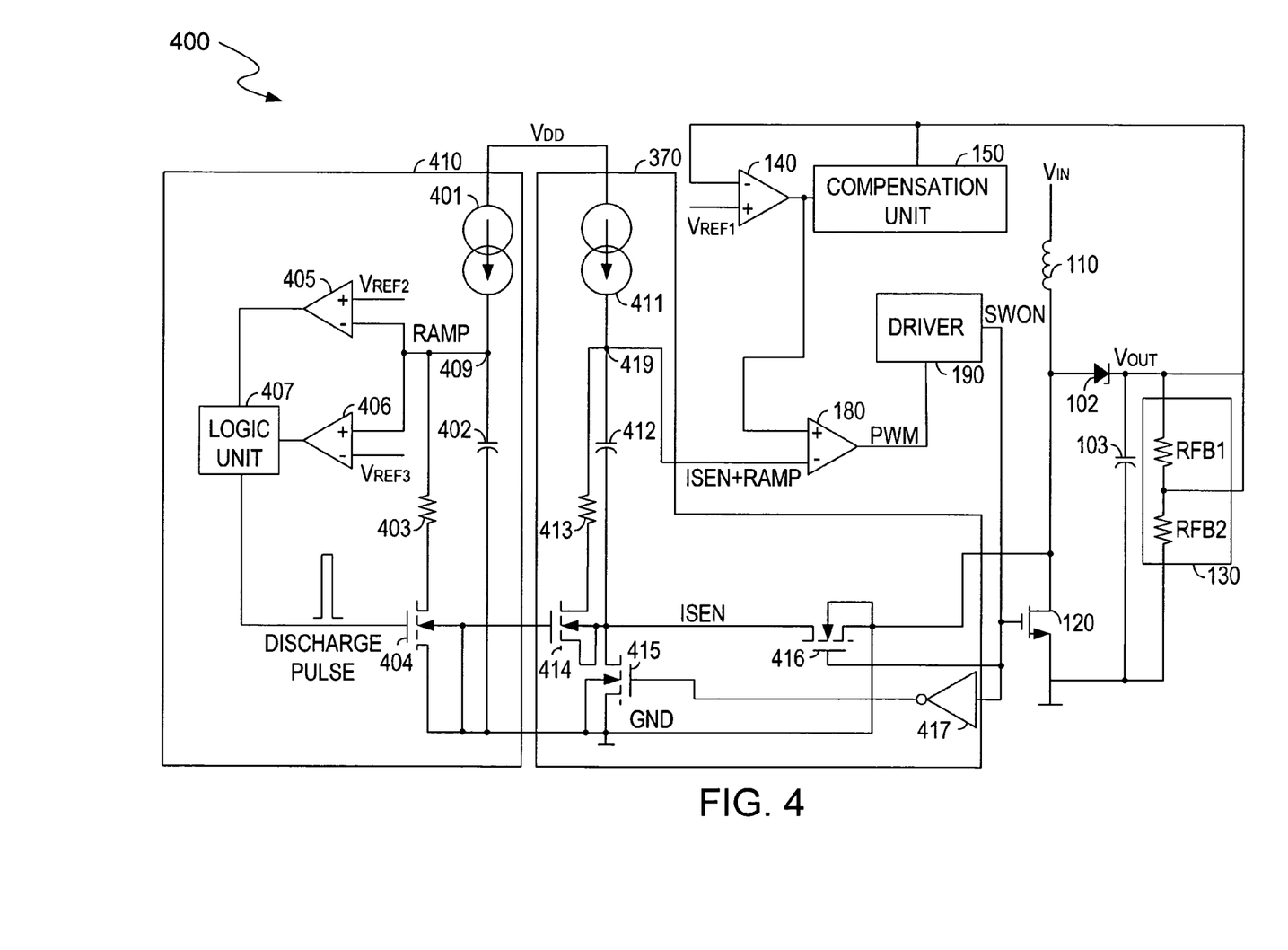
FIG. 4 is a simplified schematic diagram of the current-mode boost converter of FIG. 3.

FIG. 4 depicts a schematic diagram of an exemplary embodiment 400 of the current-mode boost converter 300 of FIG. 3. The boost converter 400 includes an oscillator 410 to generate a ramp signal at node 409. A voltage signal ISEN is generated based upon the current flowing through the power switch 120. The adder 370 can add the ramp signal from the oscillator 410 to the voltage signal ISEN and then generate a sum signal at node 419.

The oscillator 410 includes a current source 401, a capacitor 402, a resistor 403, a discharging switch 404, comparators 405 and 406 and a logic unit 407. The discharging switch 404 is preferably a NMOS transistor. The logic unit 407 generates a pulse signal to control states of the NMOS transistor 404. The pulse signal can control the charging and discharging of the capacitor 402 by controlling the states of the NMOS transistor 404. The current source 401 can provide a current to charge the capacitor 402 when the NMOS transistor 404 is turned off. When the NMOS transistor 404 is turned on, the capacitor 402 will be discharged via the resistor 403. The charging and discharging of the capacitor 402 will produce a voltage signal RAMP at node 409. When the voltage signal RAMP is larger than a threshold voltage $V_{REF2}$, for example, 1 volt during a charging mode, the comparator 405 will generate 0 to the logic unit 407. The logic unit 407 will set the pulse signal to 1, and hence the NMOS transistor 404 will be turned on. A discharge mode will be initiated and hence the voltage signal RAMP starts to decrease. When the voltage signal RAMP decreases to a value lower than a threshold voltage $V_{REF3}$, for example, 0.1 volts in the discharging mode, the comparator 406 will generate 0 to the logic unit 407. In this condition, the logic unit 407 will set the pulse signal to 0 to turn off the NMOS transistor 404. Consequently, the discharging of the capacitor 402 is stopped and a new charging cycle starts. Based upon the aforementioned charging and discharging, the voltage signal RAMP will be maintained between a valley, for example, 0.1 volts and a predetermined peak that can be set base upon a specific requirement from a user. In this embodiment, the voltage signal RAMP may be a periodic saw-tooth signal.

The adder 370 includes a current source 411, a capacitor 412, a resistor 413, switches 414, 415 and 416 and an inverter 417. The switches 414, 415 and 416 are preferably NMOS transistors. The simple construction without internal feedback loop of the adder 370 can greatly avoid huge limitation on bandwidth, therefore the switching frequency of the boost converter 400 is enlarged. Since the current sources 401 and 411 form a current mirror, a charging current provided by the current source 411 is N times of that provided by the current source 401 where N may be any positive integer. The capacitor 412 matches the capacitor 402 and the resistor 413 matches the resistor 403. In other words, the capacitor 412 can be the same type of the capacitor 402 and the resistor 413 can also be the same type of the resistor 403. In this embodiment, suppose that the mirrored current is equal to the current provided by the current source 401, the voltage difference across the capacitor 412 will be equal to the voltage difference across the capacitor 402.

When the signal SWON is set to 1, the power MOSFET 120 is turned on and at the same time the NMOS transistor 416 is also turned on. In this condition, the voltage signal ISEN is approximately equal to the voltage difference between a drain terminal and a source terminal of the power MOSFET 120, i.e., $V_{DS}$ of the power MOSFET 120. Since the voltage $V_{DS}$ is equal to the current flowing though the power MOSFET 120 multiplied by the conduction resistance of the power MOSFET 120, the voltage signal ISEN is an indication of the sensed switch current.

Additionally, the inverter 417 can convert the signal SWON from 1 to 0 to drive the NMOS transistor 415 in this condition. The NMOS transistor 415 will be turned off and consequently the capacitor 412 will be charged by the mirrored current from the current source 411 to a value equal to the sum signal of the voltage signal ISEN and the voltage signal RAMP. In other words, the voltage at the upper plate of the capacitor 412 (i.e., at node 419) is equal to the sum signal of the voltage signal ISEN and the voltage signal RAMP at node 409 in this situation.

When the signal SWON is set to 0, the power MOSFET 120 is turned off and the NMOS transistor 416 is also turned off. In this situation, the inverter 417 converts the signal SWON from 0 to 1 and the NMOS transistor 415 will be turned on. As a result, the voltage at a lower plate of the capacitor 412 will be pulled to the ground and hence the voltage signal ISEN is pulled to the ground. Because of the intrinsic characteristic of the capacitor 412, the voltage at an upper plate of the capacitor 412 will be pulled down accordingly and the voltage difference across the capacitor 412 will maintain constant. Hence, the voltage difference across the capacitor 412 is still equal to the voltage difference across the capacitor 402. Consequently, the voltage at the upper plate of the capacitor 412 (i.e., at node 419) will be equal to the voltage signal RAMP at an upper plate of the capacitor 402 (i.e., node 409).

As a result, the adder 370 will output a voltage signal at the upper plate of the capacitor 412 equal to the sum signal of the voltage signal RAMP and the voltage signal ISEN. The output voltage signal from the adder 370 is sent to an inverting terminal of the comparator 180 as its first input. The voltage divider 130 can scale down the output voltage $V_{OUT}$ and send a feedback voltage $V_{FB}$ to the error amplifier 140. The error amplifier 140 compares the feedback voltage $V_{FB}$ with a reference voltage $V_{REF1}$ and generates an error signal. The error signal is delivered to a non-inverting terminal of the comparator 180 as its second input. The comparator 180 compares the first and second inputs and generates a PWM signal. The driver 190 can be a logic unit that receives the PWM signal from the comparator 180 and generates a switch control signal SWON to drive the power MOSFET 120. The compensation unit 150 provides frequency compensation to enable the output voltage $V_{OUT}$ to maintain stable.

Figure 5:
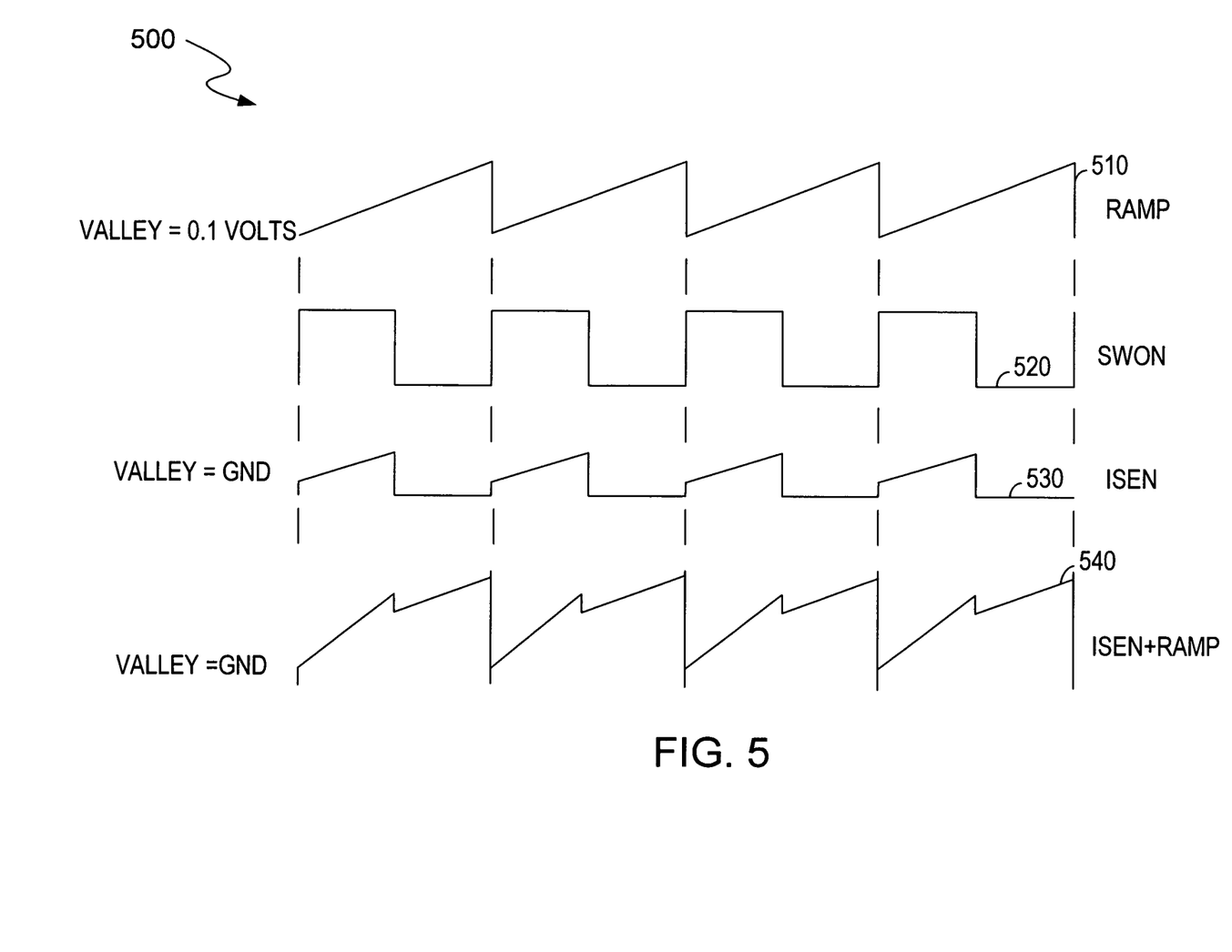
FIG. 5 illustrates a schematic diagram of the signals in the current-mode boost converter of FIG. 4.

FIG. 5 illustrates a schematic diagram 500 of the signals in the current-mode boost converter 400 of FIG. 4. Plot 510, 520, 530 and 540 respectively illustrate the voltage signal RAMP at node 409 (i.e., the upper plate of the capacitor 402), the output signal of the driver 190, the voltage signal at the lower plate of the capacitor 412 and the output voltage signal of the adder 370 (i.e., the voltage signal at node 419 or the upper plate of the capacitor 412). When the capacitor 402 is charged by the current source 401, the voltage signal RAMP will increase. When the voltage signal RAMP is larger than the threshold voltage $V_{REF2}$, the output signal of the logic unit 407 will control the NMOS transistor 404 to be turned on. Hence, the voltage signal RAMP will be discharged in a very short time. Those skilled in the art will appreciate that the peak of the voltage signal RAMP is not fixed and can be set to any value according to the specific requirement of the circuit design.

As described before, when the signal SWON is set to 1, both of the power MOSFET 120 and the NMOS transistor 416 are turned on, and hence the voltage signal ISEN is equivalent to $V_{DS}$ of the power MOSFET 120. The voltage signal ISEN will increase as the current flowing through the power MOSFET 120 become larger. The NMOS transistor 415 is turned off and the capacitor 412 will be charged similar to the capacitor 402. In this situation, the output signal of the adder 370 is equal to the sum signal of the voltage signals RAMP and ISEN. The slope of the output signal of the adder 370 will be larger than that of the voltage signal RAMP as shown by plot 540. When the signal SWON is set to 0, both of the power MOSFET 120 and the NMOS transistor 416 are turned off, but the NMOS transistor 415 is turned on. Hence, the voltage signal ISEN will be pulled to the ground. The voltage at the upper plate of the capacitor 412 is also pulled down to maintain the voltage difference across the capacitor 412 constant. In this situation, the output signal of the adder 370 is equal to the voltage signal RAMP, and so the slope of the output signal of the adder 370 is the same as that of the voltage signal RAMP as shown by plot 540. The direct addition function without feedback described above can greatly reduce the delay resulted from the feedback circuitry and so the boost converter 400 can maintain good stability and reliable performance when the switching frequency of the power MOSFET 120 is very large, for example, lager than 2 MHz.

Figure 6:
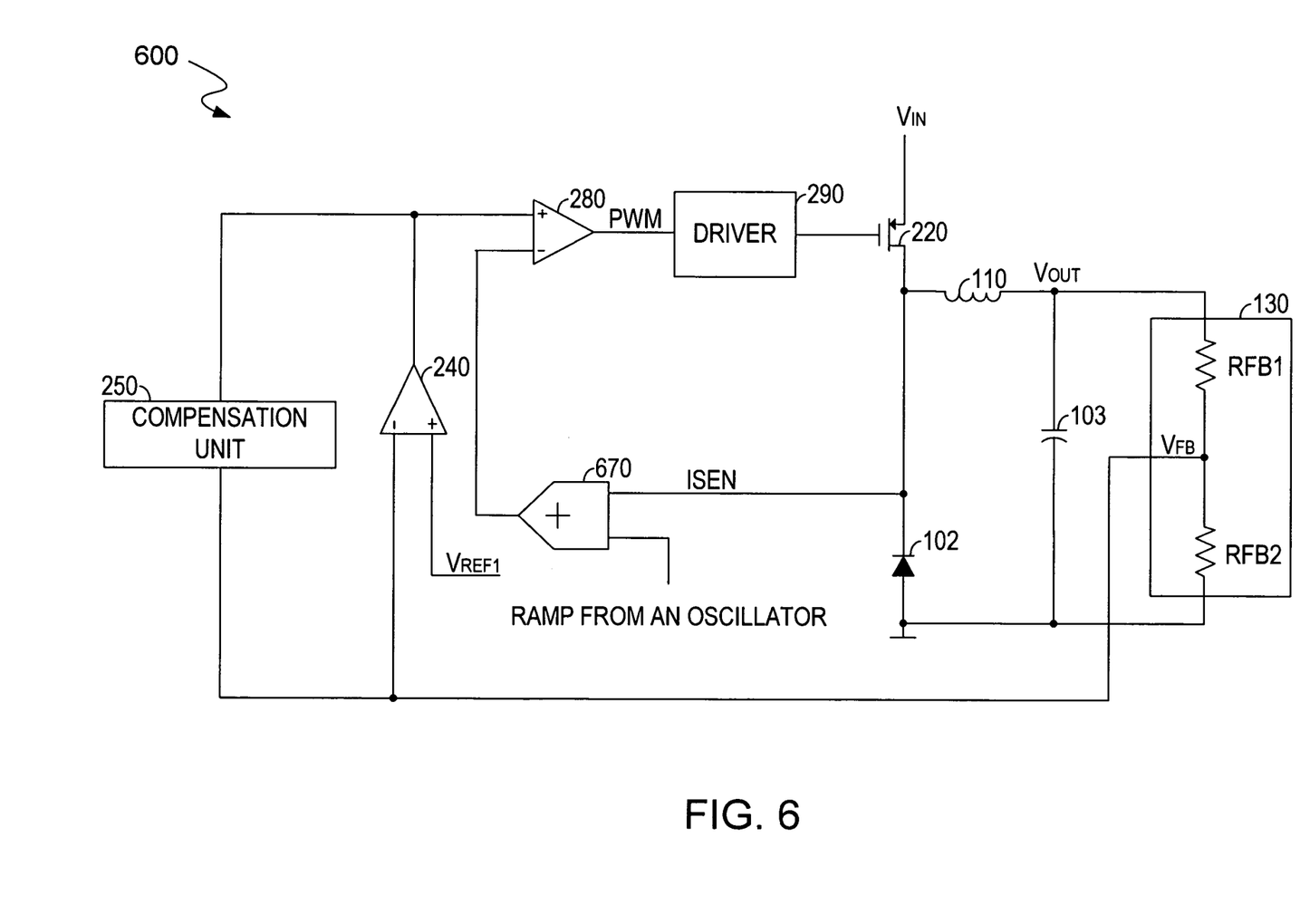
FIG. 6 is a block diagram of an exemplary current-mode buck converter according to one embodiment of the present invention.

Turning to FIG. 6, an exemplary current-mode buck converter 600 according to one embodiment of the invention is illustrated. Because the internal connection of the buck converter 600 is similar to that of the boost converter 300, the symbols for the similar components in FIG. 6 are similar to those in FIG. 3. The similar description for the similar components will be omitted herein for clarity and only the difference between the above converters will be described in detail below. The buck converter 600 is mainly composed of the inductor 110, a power switch 220, the voltage divider 130, an error amplifier 240, a compensation unit 250, an adder without an internal feedback loop 670, a comparator 280, and a driver 290. The power switch 220 is preferably implemented as a P-channel Metal Oxide Semiconductor Field Effect Transistor (MOSFET).

The buck converter 600 converts a larger DC input voltage $V_{IN}$ into a lower DC output voltage $V_{OUT}$. When the power switch 220 is turned on, the buck converter 600 will supply power to the external load (not shown) via the power switch 220, the inductor 110 and the capacitor 103. The adder 670 is connected to a drain terminal of the power MOSFET 220, the inductor 110 and a cathode of the diode 102. When the power switch 220 is turned on, a voltage signal ISEN equal to the current flowing through the power switch 220 multiplied by a conduction resistance of the power switch 220 will be sent to the adder 670 as its first input. The configuration without amplification of the voltage signal ISEN will greatly reduce the complexity of the integrated circuit design, avoid the bandwidth requirement of an amplifier and the signal distortion caused by the amplifier, and increase the switching frequency. The adder 670 can add the voltage signal ISEN directly to a ramp signal RAMP from an oscillator (not shown) and generate a sum signal sent to the comparator 280. The addition without internal feedback will eliminate the bandwidth requirement caused by the feedback loop and hence reduce the limitation on the switching frequency.

Figure 7:
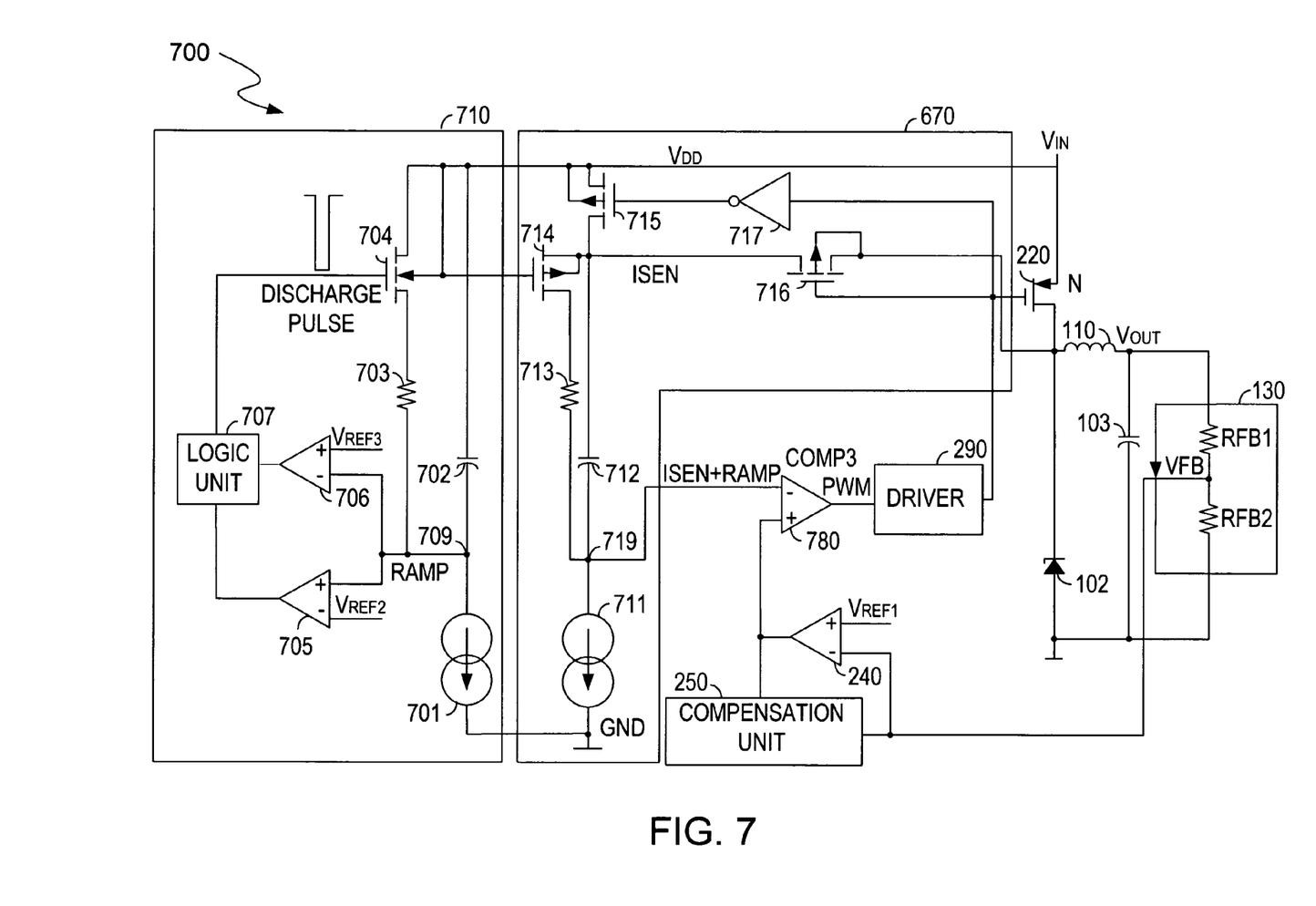
FIG. 7 is a simplified schematic diagram of the current-mode buck converter of FIG. 6.

FIG. 7 illustrates a simplified schematic diagram of an exemplary embodiment 700 of the current-mode buck converter of FIG. 6. In the buck converter 700, the symbols for the components similar to those in FIG. 3 are consistent. Hence, only the difference will be described in detail for clarity below.

The buck converter 700 includes an oscillator 710 to generate a ramp signal RAMP at node 709. The oscillator 710 mainly consists of a current sink 701, a capacitor 702, a resistor 703, a discharging switch 704, comparators 705 and 706, and a logic unit 707. The discharging switch 704 can be implemented by a PMOS transistor and is controlled by a pulse signal. The current sink 701 provides a current to pull down the voltage at a lower plate of the capacitor 702 (i.e., node 709) when the discharging switch 704 is turned off. When the discharging switch 704 is turned on, the voltage at node 709 will be pushed to a peak voltage via the resistor 703. The abovementioned process will result in a voltage signal RAMP at node 709. When the voltage signal RAMP is larger than a threshold voltage $V_{REF3}$, for example, $V_{DD}$-0.1 volts the comparator 705 will generate a logic 1 to the logic unit 707. The logic unit 707 will set the pulse signal to 1, and hence the PMOS transistor 704 will be turned off. The increase of the voltage at node 709 will be stopped and the voltage signal RAMP will begin to decrease because the current sink 701 starts to operate. When the voltage signal RAMP decreases to a value lower than a lower threshold voltage $V_{REF2}$, for example, $V_{DD}$-1 volts, the comparator 706 will generate 0 at its output. In this condition, the logic unit 707 will set the pulse signal to be 0 so as to turn on the discharging switch 704. Accordingly, the decrease of the voltage signal RAMP will be stopped and then a new cycle will be initiated. Based on the process described previously, the voltage signal RAMP will be maintained between a predetermined valley value and a predetermined peak value. In this embodiment, the voltage signal RAMP is a periodic saw-tooth signal.

The adder 670 includes a current sink 711, a capacitor 712, a resistor 713, switches 714, 715 and 716, and an inverter 717. The switches 714, 715 and 716 are preferably PMOS transistors. The simple configuration without an internal feedback loop of the adder 670 can eliminate the bandwidth limitation caused by the feedback loop and so the switching frequency of the buck converter 700 is greatly enlarged. Since the current sinks 701 and 711 form a current mirror, a mirrored current provided by the current sink 711 is N times of that provided by the current sink 701 where N is a positive integer. The capacitor 712 matches the capacitor 702 and the resistor 713 matches the resistor 703. In this embodiment, suppose that the mirrored current is equal to the current provided by the current sink 701, the voltage difference across the capacitor 712 will be equal to the voltage difference across the capacitor 702.

When a switch control signal SWON provided by the driver 290 is set to 0, the voltage signal ISEN relative to the sensed switch current will be added to the voltage signal RAMP. The sum signal of the signals ISEN and RAMP will be generated at node 719 (i.e., the lower plate of the capacitor 712). Conversely, when the signal SWON is set to 1, the voltage at node 719 is equal to the voltage signal RAMP because the voltage signal ISEN is equal to $V_{DD}$.

Figure 8:
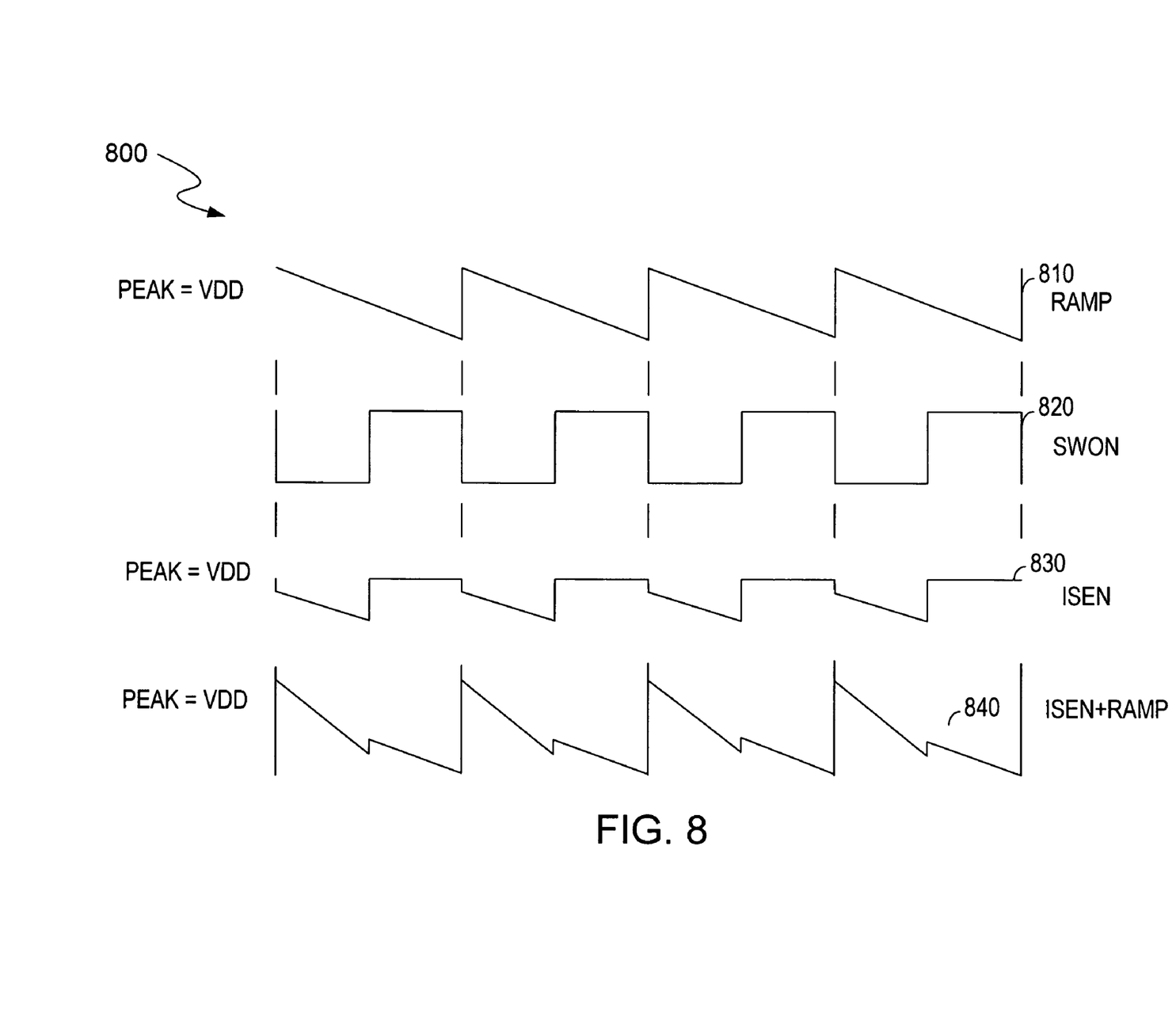
FIG. 8 illustrates a schematic diagram of the signals in the current-mode buck converter of FIG. 7.

Turing to FIG. 8, illustrated is a schematic diagram 800 of the signals in the current-mode buck converter 700 of FIG. 7. Plot 810, 820, 830 and 840 respectively illustrate the voltage signal RAMP at node 709 (i.e., the lower plate of the capacitor 702), the output signal of the driver 290, the voltage signal at the upper plate of the capacitor 712 and the output voltage signal of the adder 670 (i.e., the voltage signal at node 719 or the lower plate of the capacitor 712). When the discharging switch 704 is turned on, the voltage signal RAMP will increase in a very short time. When the voltage signal RAMP is larger than the threshold voltage $V_{REF3}$, the output signal of the logic unit 407 will control the PMOS transistor 704 to be turned off. The voltage signal RAMP will be pulled to the lower threshold voltage $V_{REF2}$. Those skilled in the art will recognize that the peak and the valley of the voltage signal RAMP are not fixed and can be set to any value according to the specific requirement of the circuit design.

As described before, when the signal SWON is set to 0, the output voltage of the adder 670 (i.e., the voltage at node 719) is equal to the sum signal of the voltage signals ISEN and RAMP. Hence, the slope of the voltage at node 719 is larger than that of the voltage signal RAMP. When the signal SWON is set to 1, the signal ISEN will be equal to $V_{DD}$ and the output voltage of the adder 670 is equal to the voltage signal RAMP. In this situation, the slope of the voltage at node 719 is equal to that of the voltage signal RAMP. The simple addition function without feedback described above can greatly reduce the delay resulted from the feedback circuitry and so the boost converter 400 can maintain good stability and reliable performance when the switching frequency of the power MOSFET 220 is very high, for example, larger than 2 MHz.

It is appreciated to those skilled in the art that the adder without an internal loop 370 or 670 can also be used in a current-mode buck-boost converter although the detailed configuration of the adder in the current-mode buck-boost converter may be a little different from that in the current-mode buck converter. For more clarity, the detailed description of the configuration of the adder in the buck-boost converter is omitted herein since the alternation of the internal configuration of the adder in the buck-boost converter will be recognized by those skilled in the art.

Figure 9:
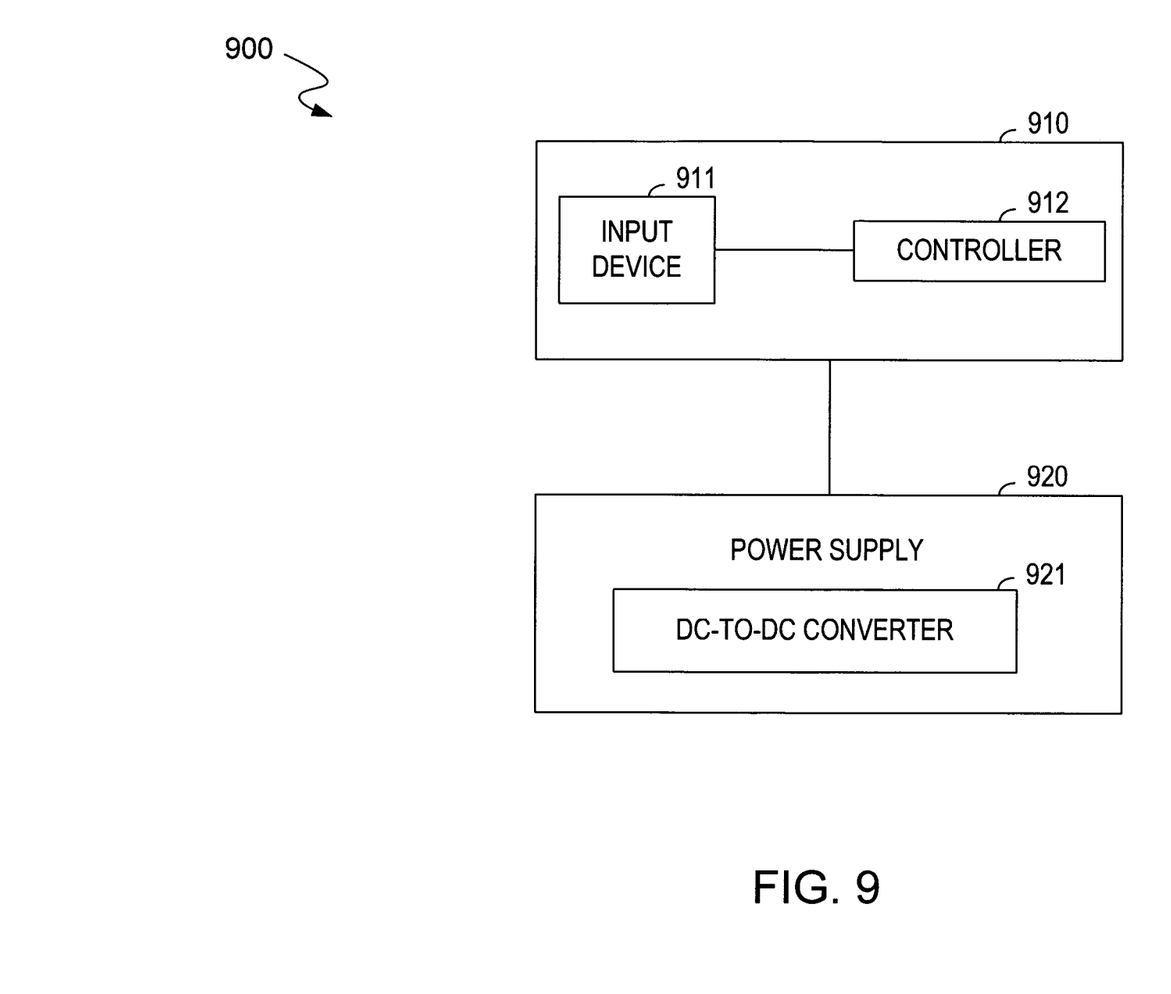
FIG. 9 illustrates an electronic system including the current-mode boost converter of FIG. 4 or the current-mode buck converter of FIG. 7.

The aforementioned current-mode DC-to-DC converter can be applied to various electronic systems, for example, a portable computer, a cell phone, a digital camera or the like. FIG. 9 illustrates an exemplary electronic system 900 mainly consisting of an electronic circuit 910 and a power supply 920. The electronic circuit 910 includes an input device 911 and a controller 912. The input device 910 may take inputs from a user. The controller 912 can perform various operations based upon the inputs from the user. The power supply can supply power to the electronic circuit 910 that includes a DC-to-DC converter 921. In this embodiment, the DC-to-DC converter 921 is a current-mode converter. The DC-to-DC converter 921 can employ the apparatuses and methods described in the above-mentioned embodiments, for example the current-mode boost converter of FIG. 4 or the current-mode buck converter of FIG. 7. The current-mode DC-to-DC converter 921 can provide a desirable DC voltage to power the electronic circuit 910, and the detailed description of the function of the current-mode DC-to-DC converter 921 will be omitted herein for clarity.

In operation, the current-mode DC-to-DC boost converter 400 has two kinds of frequency compensation loops. One is an outer voltage loop mainly formed by the voltage divider 130, the error amplifier 140 and the compensation unit 150. Another is an inner current loop mainly including the adder 370. The inner current loop without an amplifier will greatly reduce the complexity of the circuitry design, the limitation on bandwidth and the switching frequency.

The oscillator 410 can generate the voltage signal RAMP whose peak and valley values are determined by charging and discharging the capacitor 402. Based upon the match of the relative components in the oscillator 410 and the adder 370, the capacitor 412 will in a similar condition to the capacitor 402 whether in the charging mode or in the discharging mode. Controlled by the switch control signal SWON, the adder 370 can add the voltage signal RAMP in the oscillator 410 to the voltage signal ISEN relative to the current flowing through the power switch 120 and generate a sum signal to the comparator 180. The comparator 180 generates the PWM signal to control the driver 190 that generates the signal SWON.

When the input voltage $V_{IN}$ varies, the voltage signal ISEN can sense this variance in real time. The adder 370 sends the sum signal of the voltage signals RAMP and ISEN to the comparator 180. The comparator 180 compares the sum signal with the error signal from the error amplifier 140 and hence the pulse width of the PWM signal at the output terminal of the comparator 180 will be regulated. As a result, the conduction time of the power switch 120 will be changed and consequently the output voltage $V_{OUT}$ will be regulated during a transient period. Based upon the above-mentioned regulation, the output voltage $V_{OUT}$ will maintain stable.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A current-mode converter, comprising:
   an inductor;
   a power switch coupled to the inductor, the power switch being capable of providing a voltage signal according to a current flowing through the power switch;
   an oscillator for generating a ramp signal, wherein the oscillator further comprising,
      a current source,
      a capacitor being having an upper plate, the capacitor being charged by the current source,
      a resistor coupled to the capacitor,
      a switch coupled to the resistor to control charging and discharging of the capacitor to provide the ramp signal at the upper plate of the capacitor,
      a plurality of comparators comparing the ramp signal with a plurality of threshold voltages, and
      a logic unit controlled by the plurality of comparators and capable of generating a pulse signal to control the switch;
   an adder coupled to the inductor, the adder being capable of adding the ramp signal from the oscillator to the voltage signal and generating a sum signal;
   an error amplifier for comparing a feedback voltage with a reference voltage and generating an error signal;
   a comparator for comparing the error signal with the sum signal and generating a pulse-width modulation (PWM) signal; and
   a driver for receiving the PWM signal and generating a switch control signal to control the power switch and the adder.

2. The current-mode converter of claim 1, further comprising:
   a feedback circuit for scaling down a DC output voltage and generating the feedback voltage; and
   a compensation circuit coupled between the feedback circuit and the comparator to provide frequency compensation.

3. The current-mode converter of claim 1, wherein the current-mode converter is a boost converter.

4. The current-mode converter of claim 1, wherein the adder further comprising:
   a current source, the current source and the current source in the oscillator forming a current mirror;
   a capacitor having an upper plate, the capacitor being charged by the current source;

a resistor coupled to the current source and the capacitor;
a plurality of switches coupled to the capacitor, the resistor and the driver for controlling charging and discharging of the capacitor, charging and discharging of the capacitor generating the sum signal at the upper plate of the capacitor; and
an inverter coupled to the driver, the inverter controlling one of the plurality of switches.

5. The current-mode converter of claim 4, wherein the capacitor and the resistor in the adder match the capacitor and the resistor in the oscillator respectively.

6. The current-mode converter of claim 4, wherein a voltage difference across the capacitor in the adder is equal to a voltage difference across the capacitor in the oscillator during a transient period.

7. The current-mode converter of claim 1, wherein the current-mode converter is a buck converter.

8. A current-mode buck converter comprising:
an inductor;
a power switch coupled to the inductor, the power switch being capable of providing a voltage signal according to a current flowing through the power switch;
an oscillator for generating a ramp signal, wherein the oscillator further comprising:
a current sink;
a capacitor being having a lower plate, the capacitor being discharged by the current sink;
a resistor coupled to the capacitor;
a switch coupled in serial with the resistor to control charging and discharging of the capacitor to provide the ramp signal at the lower plate of the capacitor;
a plurality of comparators comparing the ramp signal with a plurality of threshold voltages; and
a logic unit being controlled by the plurality of comparators and generating a pulse signal to control the switch;
an adder coupled to the inductor, the adder being capable of adding the ramp signal from the oscillator to the voltage signal and generating a sum signal;
an error amplifier for comparing a feedback voltage with a reference voltage and generating an error signal;
a comparator for comparing the error signal with the sum signal and generating a pulse-width modulation (PWM) signal; and
a driver for receiving the PWM signal and generating a switch control signal to control the power switch and the adder.

9. The current-mode buck converter of claim 8, wherein the adder comprising:
a current sink, the current sink and the current sink in the oscillator forming a current mirror;
a capacitor having a lower plate, the capacitor being discharged by the current sink;
a resistor coupled to the current sink and the capacitor;
a plurality of switches coupled to the capacitor, the resistor and the driver to control charging and discharging of the capacitor to generate the sum signal at the lower plate of the capacitor; and
an inverter coupled to the driver, the inverter controlling one of the plurality of switches.

10. The current-mode converter of claim 9, wherein the capacitor and the resistor in the adder match the capacitor and the resistor in the oscillator respectively.

11. The current-mode converter of claim 9, wherein a voltage difference across the capacitor in the adder is equal to a voltage difference across the capacitor in the oscillator during a transient period.

12. A method for converting a DC input voltage to a DC output voltage, comprising the steps of:
(a) receiving the DC input voltage;
(b) sensing a current flowing through a power switch according to the DC input voltage;
(c) generating a voltage signal according to the sensed current;
(d) generating a mirrored current according a predetermined current;
(d1) charging a capacitor by the mirrored current under control of a plurality of switches;
(d2) discharging the capacitor under control of the plurality of switches;
(d3) generating the voltage signal at one plate of the capacitor;
(d4) matching a value of the ramp signal to a voltage difference of the capacitor;
(d5) adding the voltage difference to the voltage signal based upon the charging and discharging of the capacitor;
(e) comparing an addition result with a predetermined error signal;
(f) generating a PWM signal according to a comparison result between the error signal and the addition result;
(g) converting the PWM signal to a switch control signal;
(h) driving the power switch with the switch control signal;
(i) controlling the addition of the ramp signal and the voltage signal with the switch control signal; and
(j) generating a DC output voltage under control of the power switch.

13. The method of claim 12, further comprising the steps of:
generating a feedback voltage proportional to the DC output voltage;
comparing the feedback voltage with a reference voltage; and
generating the predetermined error signal based upon the comparison.

14. The method of claim 12, further comprising the steps of:
generating the ramp signal.

15. The method of claim 14, wherein the step of generating the ramp signal further comprising the steps of:
charging a capacitor by a predetermined current when a first switch is turned off;
discharging the capacitor when the first switch is turned on;
generating the ramp signal according to a voltage difference across the capacitor based upon the charging and discharging of the capacitor;
comparing the ramp signal with a plurality of threshold voltages; and
generating a control signal to drive the first switch based upon a comparison result.

16. An electronic system comprising:
an input device for taking inputs from an user;
a controller for performing operations based on the inputs from the user; and
a power supply for supplying power to the electronic system, the power supply including a current-mode boost converter, the current-mode converter comprising:
an inductor;
a power switch coupled to the inductor, the power switch being capable of providing a voltage signal according to a current flowing through the power switch;
an oscillator for generating a ramp signal;

an adder coupled to the inductor, the adder being capable of adding a ramp signal from the oscillator to the voltage signal and generating a sum signal;

an error amplifier for comparing a feedback voltage with a reference voltage and generating an error signal;

a comparator for comparing the error signal with the sum signal and generating a pulse-width modulation (PWM) signal; and a driver for receiving the PWM signal and generating a switch control signal to control the power switch and the adder, wherein the adder further comprising, a current source, a capacitor having an upper plate, the capacitor being charged by the current source, a resistor coupled to the current source and the capacitor, a plurality of switches coupled to the capacitor, the resistor and the driver to control charging and discharging of the capacitor to generate the sum signal at the upper plate of the capacitor, and an inverter coupled to the driver, the inverter controlling one of the plurality of switches.

17. An electronic system comprising:

an input device for taking inputs from an user;

a controller for performing operations based on the inputs from the user; and a power supply for supplying power to the electronic system, the power supply including a current-mode buck converter, the current-mode converter comprising:

an inductor;

a power switch coupled to the inductor, the power switch being capable of providing a voltage signal according to a current flowing through the power switch;

an oscillator for generating a ramp signal;

an adder coupled to the inductor, the adder being capable of adding a ramp signal from the oscillator to the voltage signal and generating a sum signal;

an error amplifier for comparing a feedback voltage with a reference voltage and generating an error signal;

a comparator for comparing the error signal with the sum signal and generating a pulse-width modulation (PWM) signal; and a driver for receiving the PWM signal and generating a switch control signal to control the power switch and the adder, wherein the adder comprising;

a current sink;

a capacitor having a lower plate, the capacitor being discharged by the current sink;

a resistor coupled to the current sink and the capacitor;

a plurality of switches coupled to the capacitor, the resistor and the driver to control charging and discharging of the capacitor to generate the sum signal at the lower plate of the capacitor; and an inverter coupled to the driver, the inverter controlling one of the plurality of switches.

* * * * *

UNITED STATES PATENT AND TRADEMARK OFFICE
CERTIFICATE OF CORRECTION

Page 1 of 2

PATENT NO.        : 7,498,793 B2
APPLICATION NO.   : 11/716404
DATED             : March 3, 2009
INVENTOR(S)       : Ruiqing Xu It is certified that error appears in the above-identified patent and that said Letters Patent is hereby corrected as shown below:

In the drawings, Fig. 4 should be replaced with the corrected Fig. 4 as shown below:

FIG. 4

Signed and Sealed this
Third Day of September, 2013

Teresa Stanek Rea
*Acting Director of the United States Patent and Trademark Office*

CERTIFICATE OF CORRECTION (continued)

U.S. Pat. No. 7,498,793 B2

In the drawings, Fig. 7 should be replaced with the corrected Fig. 7 as shown below:

FIG. 7